United States Patent
Willamowski et al.

(10) Patent No.: US 8,390,886 B2
(45) Date of Patent: Mar. 5, 2013

(54) SYSTEM AND METHOD FOR PRINT PROFILE SELECTION

(75) Inventors: Jutta K. Willamowski, Grenoble (FR); Frederic Roulland, Le Versoud (FR); David B. Martin, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 527 days.

(21) Appl. No.: 12/638,325

(22) Filed: Dec. 15, 2009

(65) Prior Publication Data

US 2011/0141497 A1    Jun. 16, 2011

(51) Int. Cl.
*G06F 15/00* (2006.01)
(52) U.S. Cl. .................. 358/1.9; 358/1.15; 345/581
(58) Field of Classification Search .............. 358/1.15, 358/1.19, 518; 345/581
See application file for complete search history.

(56) References Cited

U.S. PATENT DOCUMENTS

| | | | |
|---|---|---|---|
| 6,344,902 B1 | 2/2002 | Duke et al. | |
| 6,452,692 B1 * | 9/2002 | Yacoub | 358/1.15 |
| 6,803,921 B1 | 10/2004 | Balasubramanian et al. | |
| 6,864,991 B1 * | 3/2005 | Takahashi | 358/1.15 |
| 7,420,704 B2 * | 9/2008 | Simpson et al. | 358/1.9 |
| 7,468,813 B1 * | 12/2008 | MacLeod | 358/1.9 |
| 7,764,400 B2 * | 7/2010 | Harrington | 358/1.9 |
| 8,018,619 B2 * | 9/2011 | Yamamoto et al. | 358/1.9 |
| 8,159,500 B1 * | 4/2012 | Bogart et al. | 345/590 |
| 8,164,785 B2 * | 4/2012 | Ferlitsch | 358/1.6 |
| 8,237,990 B2 * | 8/2012 | Kulkarni et al. | 358/3.23 |
| 2005/0012755 A1 * | 1/2005 | Dresevic et al. | 345/581 |
| 2007/0008557 A1 | 1/2007 | Harrington et al. | |
| 2007/0008558 A1 | 1/2007 | Rumph et al. | |
| 2007/0008559 A1 | 1/2007 | Rumph et al. | |
| 2007/0008560 A1 * | 1/2007 | Eschbach | 358/1.9 |
| 2007/0109569 A1 | 5/2007 | Eschbach et al. | |
| 2008/0079964 A1 | 4/2008 | Woolfe et al. | |
| 2008/0137914 A1 | 6/2008 | Minhas | |
| 2008/0143738 A1 | 6/2008 | Wolfe et al. | |
| 2008/0204829 A1 | 8/2008 | Harrington | |
| 2008/0252931 A1 * | 10/2008 | Mestha et al. | 358/3.23 |
| 2008/0253649 A1 * | 10/2008 | Wang et al. | 382/167 |
| 2009/0002782 A1 * | 1/2009 | Kulkarni et al. | 358/518 |
| 2009/0073465 A1 | 3/2009 | Rolleston et al. | |
| 2009/0122325 A1 * | 5/2009 | Farrell et al. | 358/1.9 |
| 2009/0273808 A1 * | 11/2009 | Kohli et al. | 358/1.15 |
| 2009/0310152 A1 * | 12/2009 | Roulland et al. | 358/1.9 |
| 2010/0158359 A1 * | 6/2010 | Qiao | 382/164 |
| 2011/0043849 A1 * | 2/2011 | Koh et al. | 358/1.15 |

OTHER PUBLICATIONS

David Kappos, Subject Matter Eligibility of Computer Readable Media, Feb. 23, 2010, USPTO, 1351 OG 212.*

(Continued)

*Primary Examiner* — King Poon
*Assistant Examiner* — Ted Barnes
(74) *Attorney, Agent, or Firm* — Fay Sharpe LLP

(57) ABSTRACT

A computer-based method and system for optimal print profile selection are provided. The method includes receiving a color document and print profiles into memory, identifying out-of-gamut regions within the color document, presenting the identified out-of-gamut regions to a user, receiving color accuracy requirements from the user for at least one out-of-gamut region, computing a color quality value for each of the at least one print profile based at least partially on the received color accuracy requirements, creating a ranked list comprising the at least one print profiles ranked at least partially according to the computed color quality value, and outputting the ranked list to a user terminal, a computer monitor, or computer memory.

22 Claims, 7 Drawing Sheets

OTHER PUBLICATIONS

U.S. Appl. No. 12/464,212, filed May 12, 2009, Rolleston, et al.
U.S. Appl. No. 12/473,471, filed May 28, 2009, Roulland, et al.

Gamutvision, http://www.gamutvision.com, Mar. 21, 2009.

* cited by examiner

SYSTEM AND METHOD FOR PRINT PROFILE SELECTION

CROSS REFERENCE TO RELATED PATENTS AND APPLICATIONS

The following co-pending applications, the disclosures of which are incorporated herein in their entireties by reference, are mentioned:

U.S. patent application Ser. No. 12/138,846, filed Jun. 13, 2008, entitled "Print Mediator," by Frederic Roulland, et al.

U.S. patent application Ser. No. 12/464,212, filed May 12, 2009, entitled "Color Management System and Method using Natural Language Description of Color Differences," by Robert J. Rolleston, et al.

BACKGROUND

The exemplary embodiment relates to print profile selection and finds particular application in connection with printing of a color document.

In digital production printing color workflows, document color is rendered on many different devices, such as RGB displays and color printers. Different devices have different gamuts (i.e., sets of colors which can be rendered), and are sometimes not able to reproduce the full set of colors contained in a color document. Gamuts differ not only between a display and a printer but also between printers of a different generation or printers using different types of print technology, ink, and paper.

Software tools known as gamut alarms have been used to alert users to the fact that the colors they are using within their document will be out of gamut for the selected print profile (i.e., a characterization of the combination of printer type, paper medium and print configuration) and therefore will not be reproduced accurately. Subsequently, to address this, users can change the print profile, restrict the colors in their document so as to only use print profile compatible colors, or just accept that out-of-gamut colors will print differently (i.e., an automatic gamut mapping transform algorithm will be applied). This creates a situation where gamut alarms need to be dealt with by the user in an individual one-by-one manner per printing profile. Users need to remember or record the different ways in which the print profiles relate to their color document. This makes selection of the best solution for their document difficult. Additionally, other factors that may be relevant to the user's print profile selection, such as cost, are not able to be factored into these decisions.

BRIEF DESCRIPTION

In one aspect of the exemplary embodiment, a computer-implemented method for print profile selection is provided. The method includes receiving a color document and print profiles into computer memory, identifying at least one out-of-gamut region within the color document, based at least in part on at least one print profile, presenting the identified at least one out-of-gamut region to a user, receiving color accuracy requirements from the user for the at least one out-of-gamut region, computing a color quality value for each of the print profiles based at least in part on the received color accuracy requirements, creating a list comprising the print profiles, the list being ranked at least in part according to the computed color quality value, and outputting the ranked list.

In another aspect, a computer-based system for print profile selection is provided. The system includes memory which stores a color coverage review module, a print options review module and a processor in communication with the modules which executes instructions. The color coverage review module includes instructions for receiving a color document into computer memory, receiving print profiles into computer memory, and identifying at least one out-of-gamut region within the color document based at least in part on the print profiles. The print options review module includes instructions for presenting the identified at least one out-of-gamut region to a user, receiving color accuracy requirements from the user for the at least one out-of-gamut region, computing a color quality value for each of the print profiles based at least in part on the received color accuracy requirements, ranking the print profiles based at least in part according to the computed color quality value, and outputting the ranking.

In another aspect, a method for print profile selection includes for an input color document, with a computer processor, providing for identifying at least one out-of-gamut region within the color document based at least in part on at least one of a plurality of stored print profiles, obtaining a cost of printing at least one page of the document with each of the print profiles, computing a color quality value for each of the print profiles based at least in part on at least one of the identified out of gamut regions, ranking the print profiles at least in part according to the computed color quality value, separately ranking the print profiles according to the cost of printing the at least one page of the document, providing for a user to view the rankings and to select a print profile based on at least one of the profile's quality value and cost of printing.

DETAILED DESCRIPTION

Figure 1:
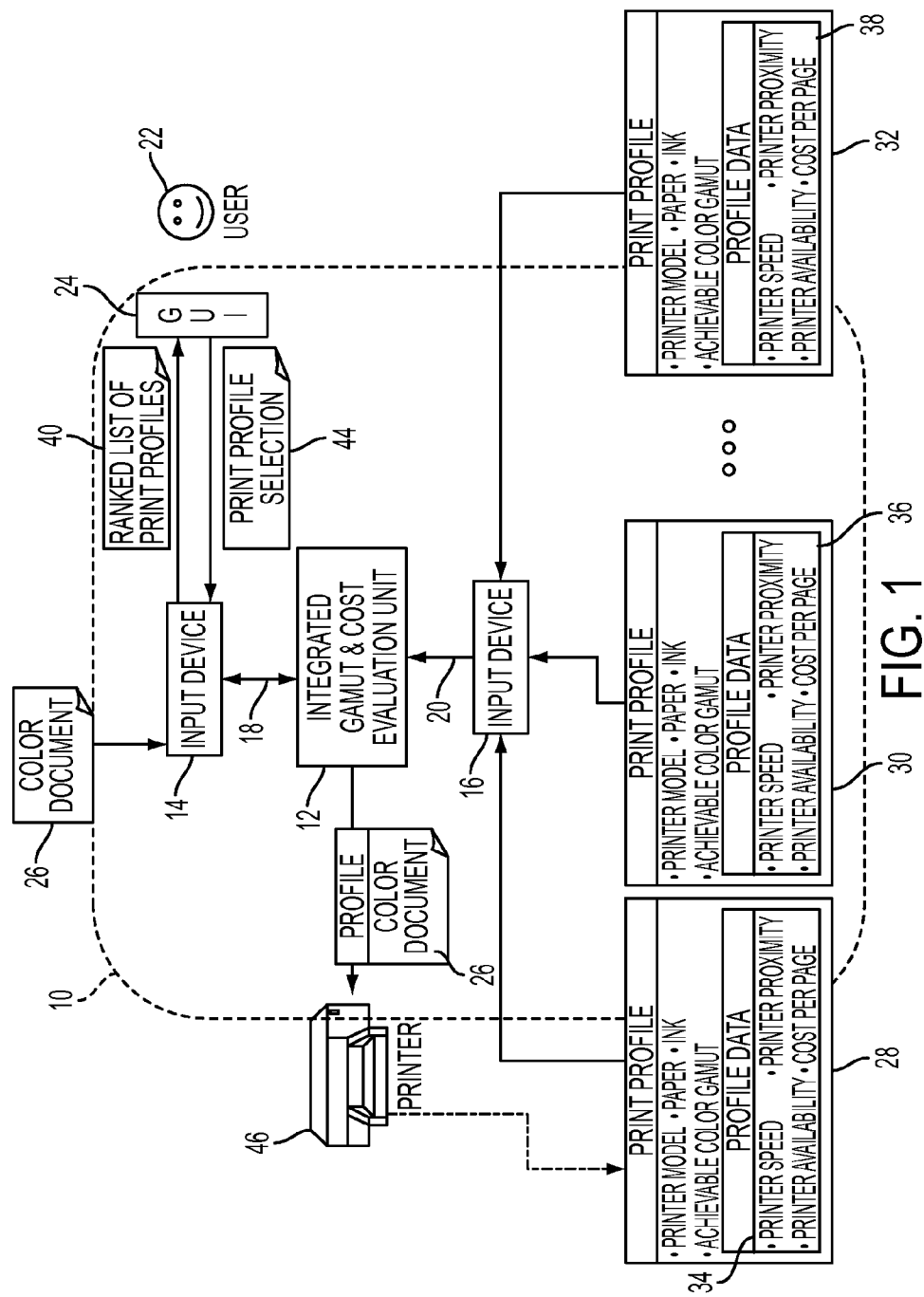
FIG. 1 is a high-level overview of a print profile selection system adapted to perform a print profile integrated gamut and cost evaluation method in accordance with one aspect of the exemplary embodiment.

Aspects of the present exemplary embodiment relate to a method and system for providing a user with an integrated gamut and cost evaluation for printing a color document over a set of available print profiles. The method and system allow the user to make an informed decision regarding the most appropriate print profile for a color document. The method and system are capable of ranking the print profiles with respect to different factors in order to assist the user in making a decision. Examples of the different factors that can be used in ranking include: how well a print profile matches a color document, print cost per page, printer availability, printer proximity, printer speed, and combinations of these. While the method is described in terms of identifying an "optimal" print profile, it is to be appreciated that the word optimal is used in a relative sense, since several factors may go into the user's decision as to which profile is optimal for a given application.

The method described herein may be instantiated as one of the first steps within a print mediator system, as disclosed, for example, in above-mentioned U.S. patent application Ser. No. 12/138,846. The print mediator system defines a framework for color problem review before submission of a color document to a print shop. In the context of print mediator, the present system may be implemented as a detector/corrector software plugin that is run as a preliminary step of the review process. For example, the system allows selecting of the appropriate print profile settings before performing any corrections. Selecting an appropriate print profile at an early stage may avoid the need to change the print profile later on and thus can avoid impacting and/or invalidating corrections previously performed by the print mediator system.

With respect to printing color documents, "gamut" refers to a subset of colors which can be accurately represented in a given circumstance, such as within a given color space or by a certain output device.

"Out-of-gamut regions" are regions of a color document whose colors are not contained in the gamut of a print profile. The regions can be of any shape or size. The present exemplary embodiment identifies two types of basic out-of-gamut regions.

The first type of region is identified through individual, well defined colors. Some examples of well defined color regions are:

Elementary graphic objects specified through a single out-of-gamut color, single-color rectangles for instance, Elements of vector graphics defined through a single out-of-gamut color, and Text elements, defined through an out-of-gamut background and/or foreground color.

The second region type uses a whole range of out of gamut colors. An example is an image or photograph sub region.

A "print profile" is a description of an individual printer setup, which includes the printer model capabilities (including its gamut), ink options, and paper type. The gamut of a print profile can be affected by the ink options and paper type.

The word "color" is used to refer to any aspect of color which may be specified, including, but not limited to, absolute color values, such as hue, chroma, and lightness, and relative color values, such as differences in hue, chroma, and lightness.

With regard to FIG. 1, a high-level overview of one aspect of a print profile selection system 10 is shown. The system 10 is adapted to perform a print profile integrated gamut and cost evaluation method as described below. The system 10 includes an integrated gamut and cost evaluation unit 12, which may be embodied in software, hardware, or a combination thereof. Unit 12 is communicatively connected to input devices 14, 16 by wired or wireless links 18, 20. Input device 14 communicates with a user 22, via a graphical user interface (GUI) 24. The GUI may be implemented through one or more of a web interface, desktop interface, and client/server interface, or the like.

Input device 14, or device 16, may also receive an input color digital document 26. Input device 16 receives print profiles 28, 30, 34. The system 10 allows the user 22 to select a print profile 28, 30, 32 for the color document 26 that best fits the printing needs of the user. One or more print profiles 28, 30, 32 are available to print the color document 26. Each individual print profile 28, 30, 32 has an associated known achievable device gamut for a specific printer and includes or is associated with data 34, 36, 38 including, for example, printer speed, printer proximity, printer availability and a predetermined cost per page, one or more of which can be used as factors in ranking the print profiles for printing the document 26. The user 22 is able to consider some or all of this data before requesting printing of the color document 26 with a chosen print profile, such as profile 28. As will be appreciated, while three profiles 28, 30, 32 are shown, corresponding to three different printers, or types of printer, there may be any number of available profiles, such as two, three, four, five or more. Additionally, a given printer may have more than one print profile. The print profiles may be provided to the system 10 by the respective printers and may be periodically updated.

The integrated gamut and cost valuation unit 12 of the exemplary system 10 receives print profile information 28, 30, 32 via input device 16 and calculates the similarity (e.g., extent of overlap) between each print profile's device gamut and the colors used color document 26. Unit 12 may also calculate the average cost per page according to a print profile's associated data 34, 36, 38, if this information is not provided in the profile.

The evaluation unit 12 is configured for creating a list 40 of print profiles that is optionally ranked according to the calculated gamut similarity and/or one or more of factors based on the associated profile data 34, 36, 38. The ranked list 40 is presented to the user 22 via the user interface 24. In the exemplary embodiment, the ranked list 40 is presented to the user even if one of the print profiles 28, 30, 32 is capable of printing the color document 26 perfectly (within its gamut). For example, the user 22 may choose to use a print profile 30 with an imperfectly matching color gamut rather than a print profile 28 with a perfectly matching color gamut to lower printing costs. The user selects a print profile 28, 30, 32 from the ranked list 40 to use and communicates a profile selection 44 to the integrated gamut and cost evaluation unit 12 via user interface 24. The evaluation unit 12 may send the color document 26 to a printer 46 corresponding to the selected print profile 28.

Figure 2:
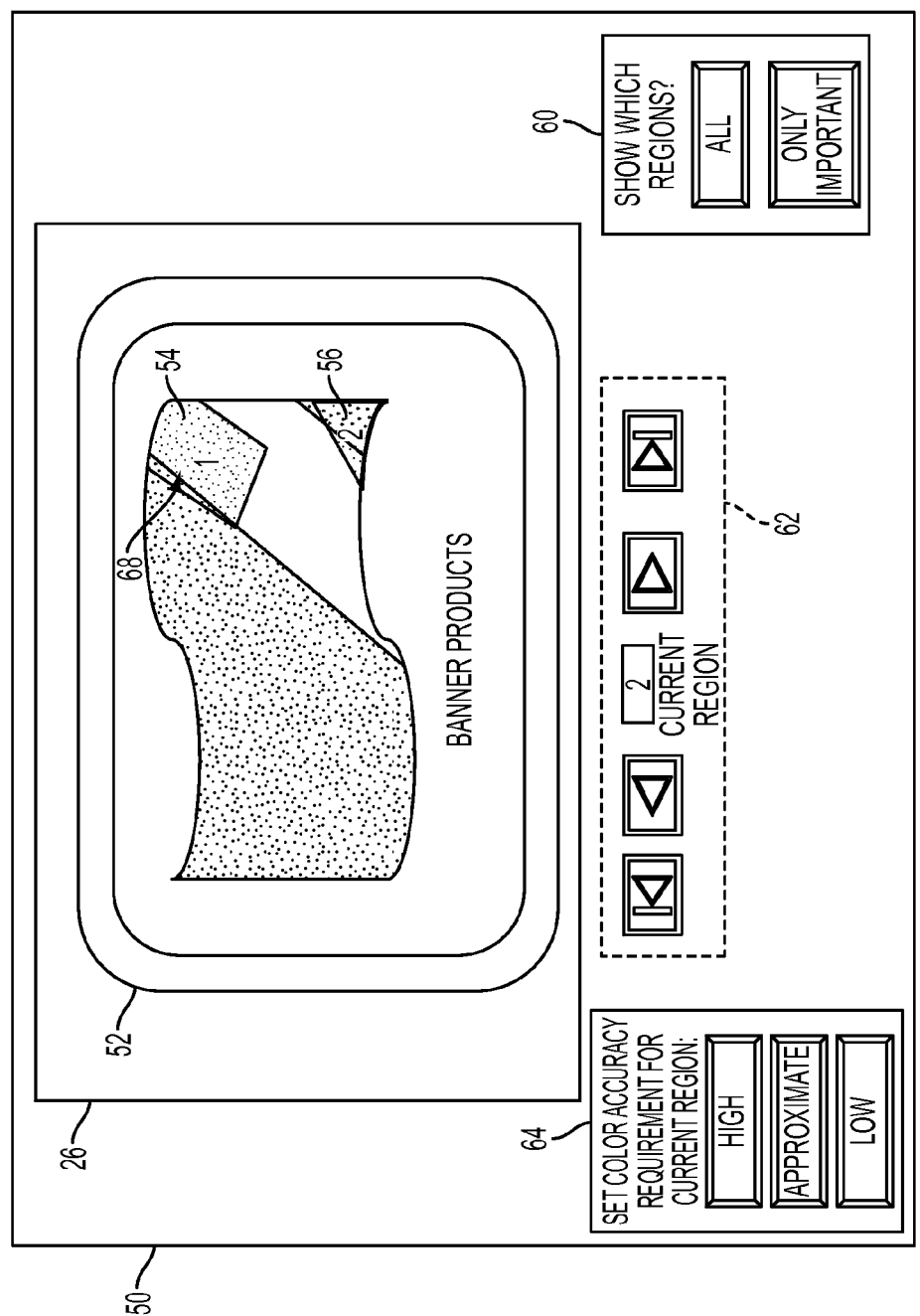
FIG. 2 is a screenshot of the graphical user interface (GUI) of the system of FIG. 1 illustrating an example color document with problematic out-of-gamut regions highlighted in accordance with one aspect of the exemplary embodiment.

With reference to FIG. 2, an example color document 26 is shown displayed on a display 50 of the GUI 24. The example color document contains a company logo 52. Since it serves as the company's trademark the user requires a very specific color gradient (such as "deep sky blue") within the logo 52.

The system 10 causes problematic areas 54, 56 to be highlighted on the display 50. The exemplary problematic areas 54, 56 are areas of the color document 26 that contain a color unable to be reproduced accurately (such as "sky blue" instead of "deep sky blue") by one or more of the print profiles 28, 30, 32 (FIG. 1), and are thus considered to be out-of-gamut regions. The example GUI displays several user interface controls 60, 62, 64, that assist a user in navigating between the out-of-gamut regions 54, 56 and viewing/setting properties of the regions 54, 56 with respect to the print profiles 28, 30, 32, and optionally in identifying critical regions 68. The show region control 60 allows the user to choose between showing all identified out-of-gamut regions 54, 56, or showing only the regions that the system 10 has identified as being important. This feature is described in more detail with respect to FIG. 6. The region switching control 62 allows the user to indicate which out-of-gamut region 54, 56 the user wants to control. The color accuracy requirement control 64 allows the user to set a color accuracy category for the out-of-gamut region currently indicated by the region switching control 60. This feature is described in more detail with respect to FIGS. 6 and 7.

Figure 3:
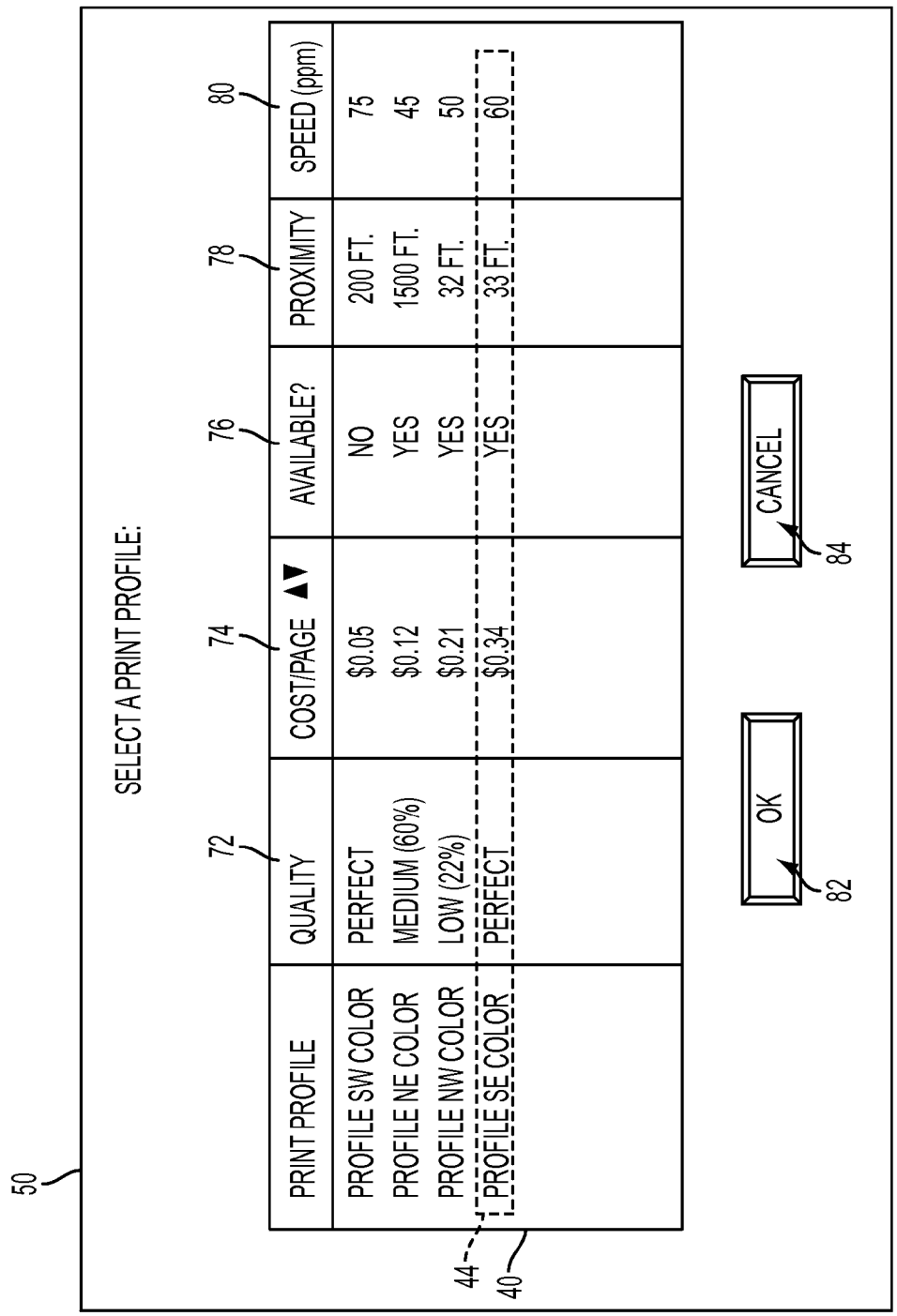
FIG. 3 is a screenshot of the GUI illustrating an example ranked list of print profiles being presented to a user in accordance with one aspect of the print profile selection system of FIG. 1.

With reference to FIG. 3, an example ranked list 40 as presented to the user via the user interface display 50 of the print profile selection system 10 is shown. The user interface 24 allows the user to view the ranked list 40 ranked (or otherwise sorted) by one of the data fields 72, 74, 76, 78, 80 available. The ranked list 40 shown in FIG. 3 is sorted by the cost per page criterion 74 in ascending order. The user interface 24 also allows the user to select a print profile to use when printing the color document 26. In FIG. 3, the profile labelled "Profile SE Color" has been chosen by the user, e.g., by clicking on the profile and actuating the accept button 82. The user can cancel the selection with the cancel button 84, and select a new ranking criteria, e.g., by selection of the quality 72 data field.

Figure 4:
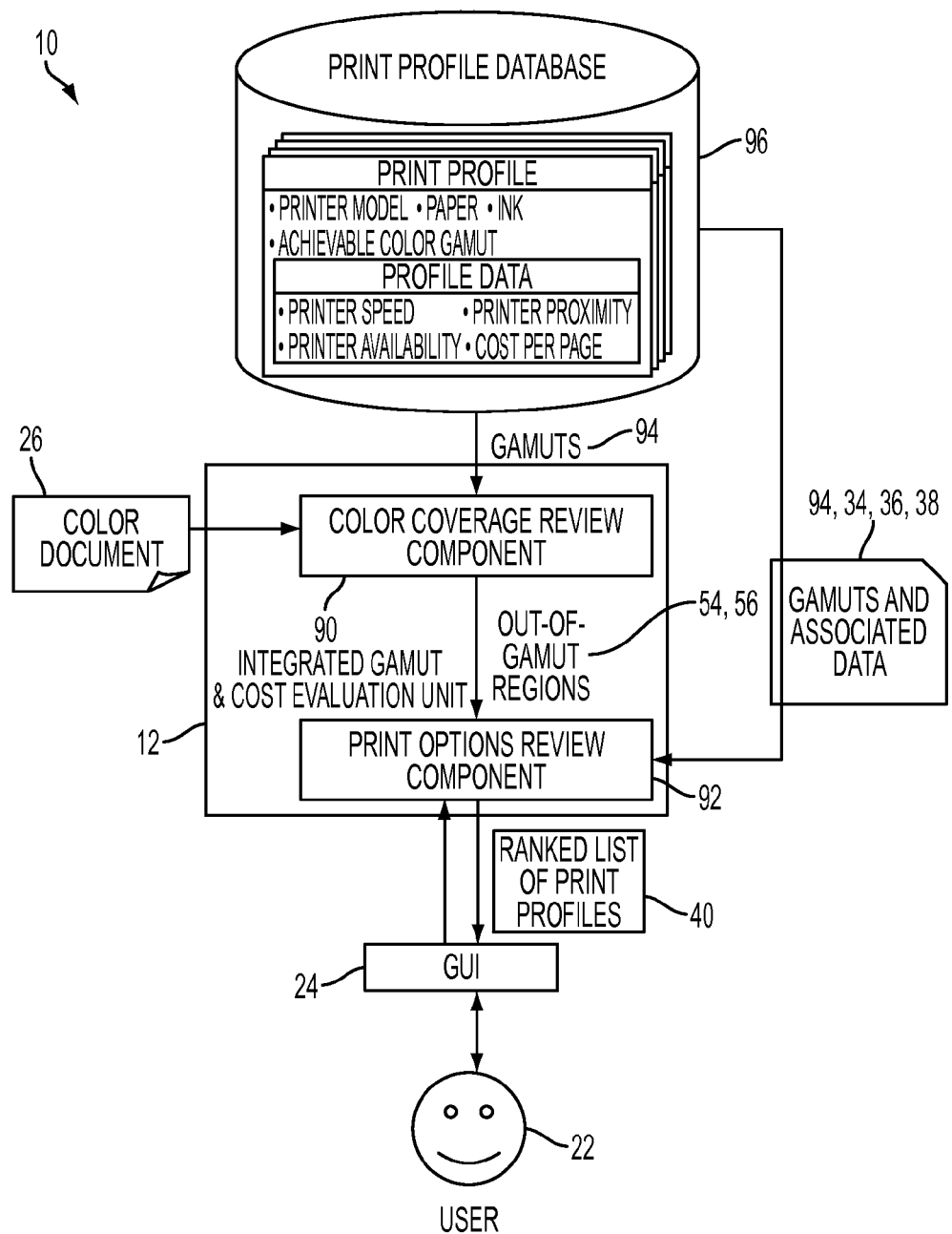
FIG. 4 illustrates a color coverage review component and a print options review component of the system of FIG. 1.

With reference to FIG. 4, the integrated gamut and cost valuation unit 12 includes two functional components 90, 92 accessible by the user 22 through the system's GUI 24. Each of the two components 90, 92 may be composed of multiple smaller components that operate functionally as a single component. A first component is a color coverage review component 90. This component receives, as input, the color document 26 and print profile gamut data 94 from a print profile database 96, which stores profiles 28, 30, 32. The color coverage review component 90 identifies out-of-gamut regions 54, 56 within the color document 26, based on the gamut information. Regions 54, 56 are areas where the document colors lie outside at least some printer gamuts 94. The color coverage review component 90 does not target one specific print profile but considers the set of available printing profiles 28, 30, 32 as a whole. Additionally, the color coverage review component 90 is configured for filtering out out-of-gamut regions that are unlikely to be important to the user.

The second component is the printing options review component 92. This component receives the out-of-gamut regions 54, 56 identified by the color coverage review component 90 and creates a ranked list 40 of print profiles. The ranked list 40 is then presented to the user 22 via the user interface 24. The print profiles in the ranked list 40 are ranked based on the individual print profile's document color coverage, user designated criticality of critical regions 68, cost, and optionally, any other user specified criteria. The user 22 reviews the resulting ranked print profile list 40 and selects a print profile that is appropriate for the color document 26.

Both system components 90, 92 rely on the database 96 of print profiles. The database 96 contains data for each available print profile 28, 30, 32, including the achievable gamut and the cost per page information. The database 96 may also contain additional data related to each print profile, such as, for example, printer availability, printer proximity to a user, printer speed and any other useful information.

Figure 5:
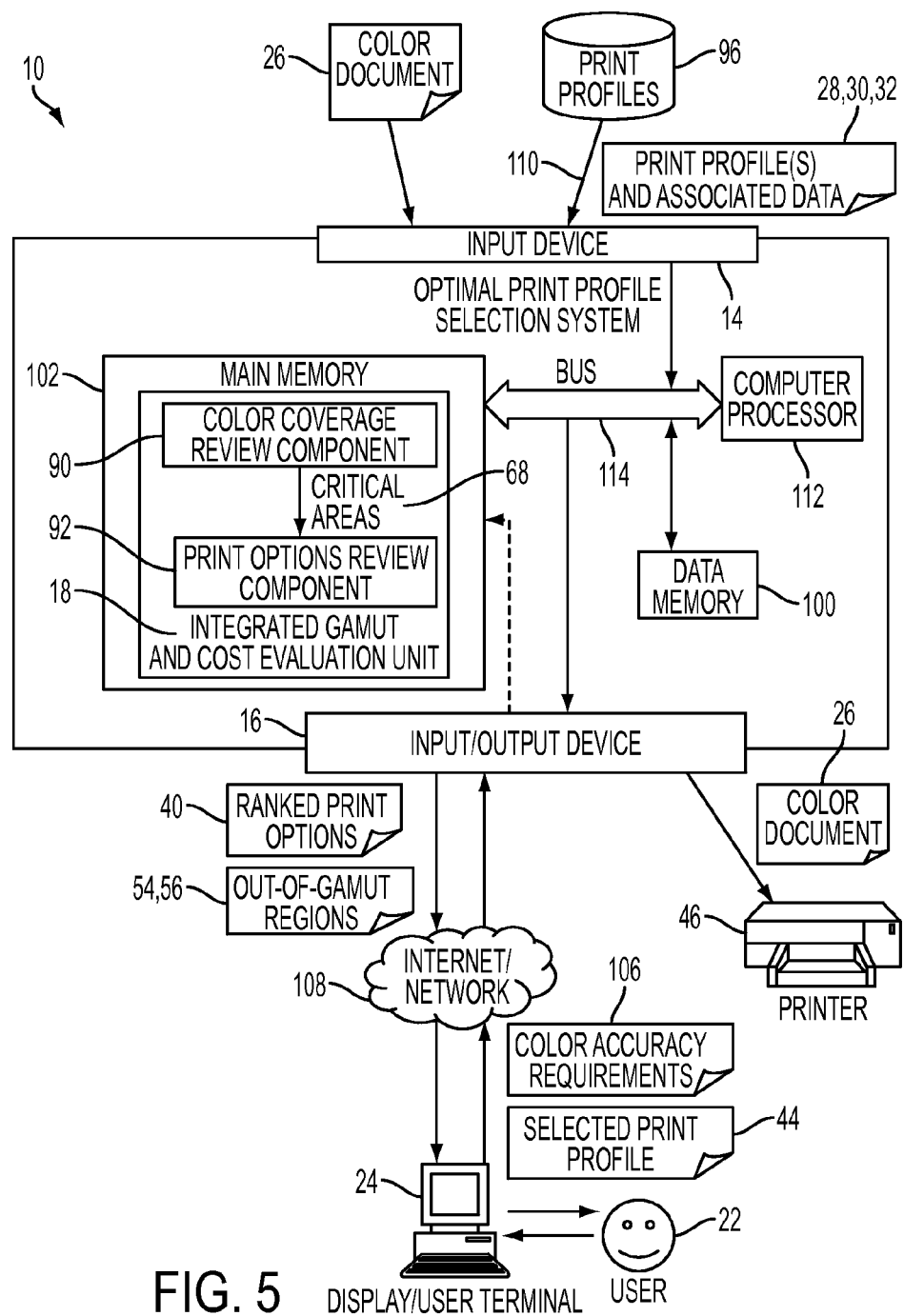
FIG. 5 is a functional block diagram of a print profile selection system in accordance with another aspect of the exemplary embodiment.

FIG. 5 illustrates the exemplary system 10 for optimal print profile selection as a computer system. The system 10 includes an input device 14, for receiving a color document 26 and a set of print profiles (and their associated data) 28, 30, 32 retrievable from the print profile database 96. Prior to inputting, the color document 26 and print profiles 28, 30, 32 may be stored in any suitable tangible media such as a ROM or RAM drive or may be input into the system 10 in the form of a carrier wave, e.g., via the Internet. Alternatively, the color document 26 and the print profiles 28, 30, 32 may be generated within the system 10, itself. The input devices 14, 16 may each include a modem link, a wired or wireless connection, USB port, floppy or hard disk receiver, or the like and may be separate or combined.

The system 10 includes data memory 100 for storing the color document 26 and print profiles 28, 30, 32 while the document is being processed. Main memory 102 of the system stores a color coverage review component 90 and a print options review component 92. The color coverage review component 90 receives as input the color document 26 and set of one or more print profiles 28, 30, 32 via the input device 14, 16. The print options review component 92 receives as input the critical areas 68 identified by the color coverage review component 90 as well as the print profiles and associated data 28, 30, 32 received via the input device 14, 16. The print options review component 92 presents the ranked print options list 40 and optionally a list of critical areas 68 to a user 22 via an input/out device 14, 16. The user 22, via a display/user terminal 24 then selects a print option 44 from the list of ranked print options 40 and sends it to the system 10 via an input/output device 16. Alternatively, if the user 22 received a list of critical areas 68, the user may send color accuracy requirements 106 back to the print options review component 92.

The user 22 may optionally connect remotely to the input/output device 16 via a network 108, such as a local area network, or wide area network 108, such as through an internet browser, or from a remote terminal 24. The database 96 of print profiles may also be connected remotely to the input/output device 14, 16 via a network 110 for providing print profile information to the components 90, 92. After the user 22 has chosen a print option 44, the color document 26 can then be sent to the printer 46 corresponding to the chosen print profile. The color coverage review component 90 and a print options review component 92 may be implemented as hardware or software or a combination thereof. In the exemplary embodiment, the components 90, 92 comprise software instructions stored in main memory 102, which are executed by a computer processor 112. The processor 112, such as the computer's CPU, may control the overall operation of the computer system by execution of processing instructions stored in memory 102. Components 14, 16, 100, 102, 112 may be connected by a data control bus 114.

As will be appreciated, the optimal print profile selection system 10 may comprise one or more computing devices, such as a personal computer, PDA, laptop computer, server computer, or combination thereof. Memories 100, 102 may be integral or separate and may represent any type of computer readable medium such as random access memory (RAM), read only memory (ROM), magnetic disk or tape, optical disk, flash memory, or holographic memory. In one embodiment, the memories 100, 102 comprise a combination of random access memory and read only memory. In some embodiments, the processor 112 and memory 100 and/or 102 may be combined in a single chip.

Figure 6:
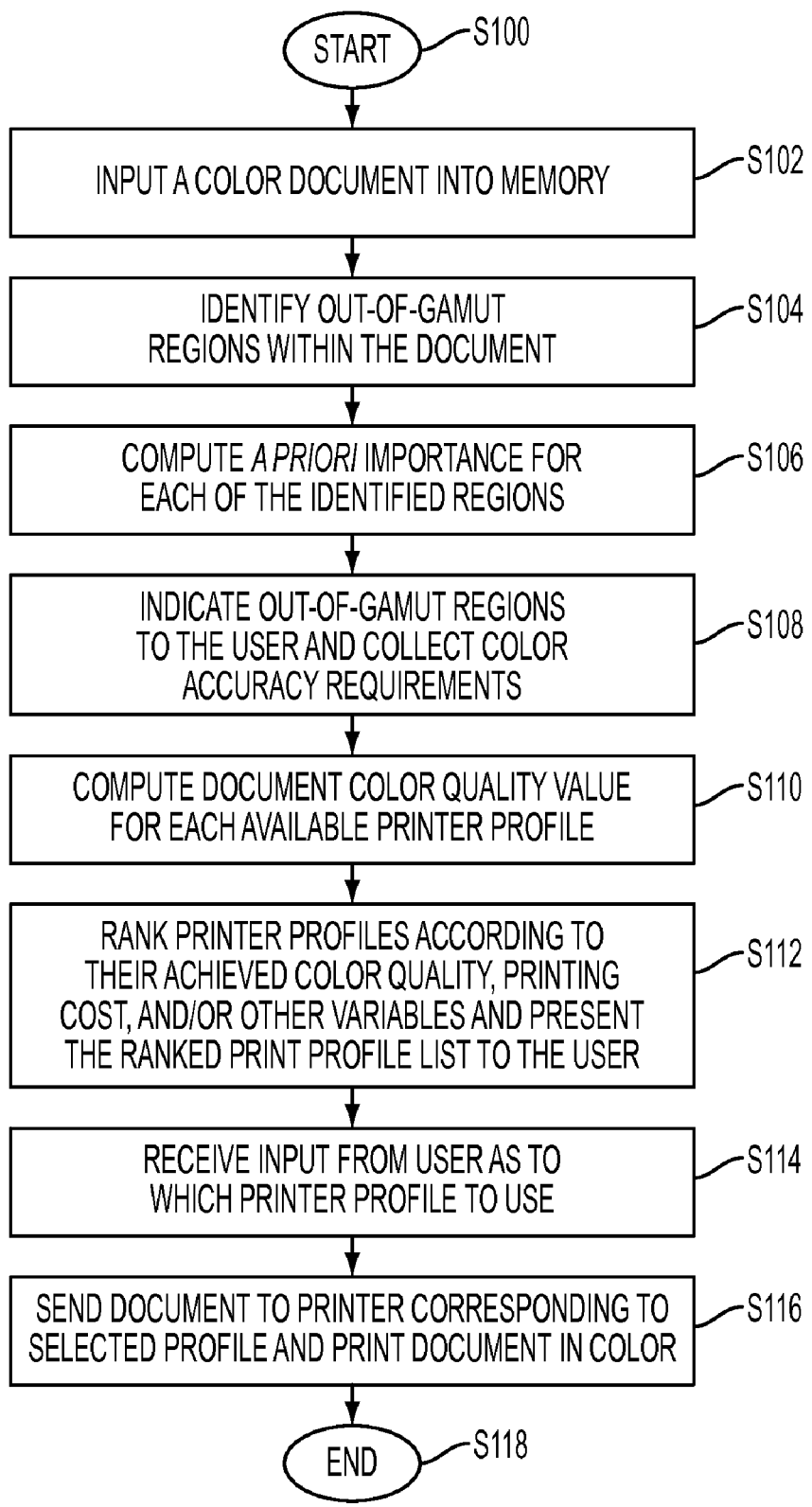
FIG. 6 is a flow diagram illustrating a method for handling out-of-gamut regions in a color document in accordance with another aspect of the exemplary embodiment.

FIG. 6 illustrates a method for selecting an optimal print profile which can be performed with the system of FIG. 5. The method begins at S100.

At S102, a color document 26 and a set of one or more print profiles 28, 30, 32 and their associated data are provided to the input device 14, 16. The inputs 14, 16 are then forwarded to the color coverage review module 90 and the print options review component 92.

At S104, the color coverage review component 90 identifies out-of-gamut regions 54, 56 within the color document 26 and passes the identified regions 54, 56 to the print options review component 92. At this stage, three options may be presented to the user 22. The first option is to review the color document 26 against a standard—or baseline—print profile, i.e., a profile corresponding to a gamut that all available print profiles support. The second option is to review the color document 26 against all of the actually available print profiles. The second option also allows for the computation of the smallest common denominator among all the print profiles 28, 30, 32—i.e., computing the smallest common gamut that can be achieved by all available printing profiles 28, 30, 32 and using this gamut as reference to determine the out-of-gamut regions 54, 56. The third option is to use the print profile 28 that corresponds to the default or usual printer option taken by the user 22. In this case, if the profile 28 provides a perfect covering of the document colors, the user can validate its use, otherwise the system 10 will restart the identification of out-of gamut regions using one of the first and second options.

Regardless of the option the user 22 chooses, the system 10 will identify one or more basic out-of-gamut regions 54, 56. Conceptually, each of these identified basic regions 54, 56 can be considered separately. However, it is more efficient and also makes sense to group and evaluate some of these regions together. In particular, basic out-of-gamut regions of the first type that are defined through the same basic color (calculated as the same or within a given tolerance level) may be grouped together for the rest of the process. Indeed, evaluating the problem for the corresponding individual basic regions is equivalent to evaluating it for the whole set. The evaluation of out-of-gamut image sub regions may be different. If all sub regions within an image are equally important, the whole set of sub regions can indeed be grouped and evaluated together. Otherwise, if some particular sub regions are more important than others, they should be handled differently. Some sub regions may for instance represent particularly important objects—such as company products; other may contain less relevant background. In such a case, these different regions should be evaluated separately. By default, the color coverage review component 90 initially groups all image regions belonging to the same image together. Nevertheless this decision is not definite. The user may reconsider it in a later stage of the process S108, and require higher color consistency for more important sub regions, and lower consistency for background sub regions.

At S106, the print options review module 92 computes the a priori importance for each of the out-of-gamut regions (i.e., critical areas) 68 identified by the color coverage review module 90. The a priori importance of out-of-gamut regions 54, 56 is an measurement of importance that can be calculated independent of any input from the user 22. A priori importance can be computed according to heuristics based on general criteria, e.g., the size of the concerned region, the location of the concerned region (regions located on the first page are in general more important than regions located towards the end of the document), the concerned color (if a color is known to be a company color or is repeatedly used within the document it is probably more important), the type of the concerned document element (logos are in general vector graphics that appear often and/or on all pages in the document), the content of the region (within images and photographs, certain subregions will in general be of special interest: regions containing faces for instance are usually important; such regions can be easily identified through use of a face detector).

Another characteristic of an out-of-gamut region may be the variance of the available print profile gamuts with respect to the original document color. For example, if the level of required color consistency for such a region across different print profiles is high, these regions will provide a relevant input for the color quality ranking of the available profiles (and may prompt printing choices or even discourage the user from making such a color selection if the user has not evidenced particular attachment to it).

At S108, the print options review component 92 presents the out-of-gamut regions 54, 56 to the user 22 and then collects color accuracy requirements 106 from the user 22. First, the system 10 displays the color document 26 to the user 22 highlighting the out-of-gamut regions 54, 56 as shown in FIG. 2. If too many regions 54, 56 have been detected, the system 10 may optionally display only the regions determined by the system via the a priori importance calculation of S106 to be the most important, first. Otherwise the system 10 may provide the user 22 with a list of critical areas 68 ranked by the a priori importance using the color coverage review component 90. The user interface 24 allows the user 22 to view directly a corresponding region by using the corresponding user control 60 (FIG. 2).

The user 22 can then inspect each problematic region and specify corresponding color accuracy requirements, which are then sent back to the print options review component 92 via the input/output device 16. For each region the user 22 may, for instance, require a level of color consistency selected from a plurality of levels, such as one of strong (high), approximate (medium), and no particular (low) color consistency. In the latter case, the corresponding region 54, 56 is tagged as ignored and not considered in the remaining steps.

Optionally, a natural language description indicating how close or far the document color is from the gamut for all or some of the available profiles is accessible to the user 22 (e.g., displayed on the display next to the problem region) and can help the user in specifying color accuracy requirements. Indeed if no printer profile can adequately print a region, the user may decide to change the region's color or to adapt the corresponding color accuracy requirements.

At S110, the print options review component 92 computes a color quality value for each available profile 28, 30, 32, which may take into account the requirements for the individual regions 54, 56 collected from the user 22 and/or the closeness of the color achieved for each region by the individual profile with respect to the color specified in the original document 26. The quality values are then used at S112. Further details about S110 are provided with respect to FIG. 7.

At S112, the system 10 provides the user 22 with a ranked list 40 of print profiles, displaying side-by-side the achieved quality calculated by the print options review component 92 in S110, a printing cost, and optionally printer availability, printer proximity to a user, and printer speed provided by the print profile database 96 and input with the print profiles 28, 30, 32.

TABLE 1 illustrates an example ranked print profile list 40. In this embodiment, the user 22 can sort the list 40 either by quality or by printing cost (although other criteria may be selectable as illustrated in FIG. 3). The profiles 28, 30, 32 are labelled with a quality level, such as perfect, medium, or low quality, depending on the profile's satisfaction of the user specified color accuracy requirements 68. In one embodiment, perfect quality means that the profile respects all user color accuracy requirements 68; medium quality means that some requirements 68 cannot be met, for instance some regions where strong consistency was required can only be printed with approximate consistency. Low quality means that some strong requirements cannot even be approximately respected.

TABLE 1

| Print Profile | Quality | Printing Cost |
| --- | --- | --- |
| Printer 1 - coated paper | Perfect | $0.13 |

TABLE 1-continued

| Print Profile | Quality | Printing Cost |
|---|---|---|
| Printer 1-plain paper | Perfect | $0.11 |
| Printer 2 | Medium (80%) | $0.05 |
| Printer 3 | Low (22%) | $0.01 |
| ... | ... | ... |

For each print profile 28, 30, 32, the user 22 can also access the list of open out-of-gamut issues (i.e., out-of-gamut regions that do not perfectly match the required color accuracy) and a natural language description of the discrepancy between the original document color and the color achievable with this print profile 28, 30, 32. The user 22 can also filter the profiles by specifying a maximal acceptable cost, a minimal required quality level, or by any other available criteria. These criteria, but also other characteristics of the print profiles, such as the required type of paper, allows for filtering out further inadequate profiles at any stage and even from the beginning of the process.

At S114, the user 22 selects a print profile 28, 30, 32 from the ranked list of print profiles 40. The selected print profile is then sent to the print profile selection system 10 via the input/output device 16.

At S116, the print profile selection system 10 sends the color document 26 to the printer 46 corresponding to the selected print profile 28. The color document 26 is then printed. The method ends at S118.

Figure 7:
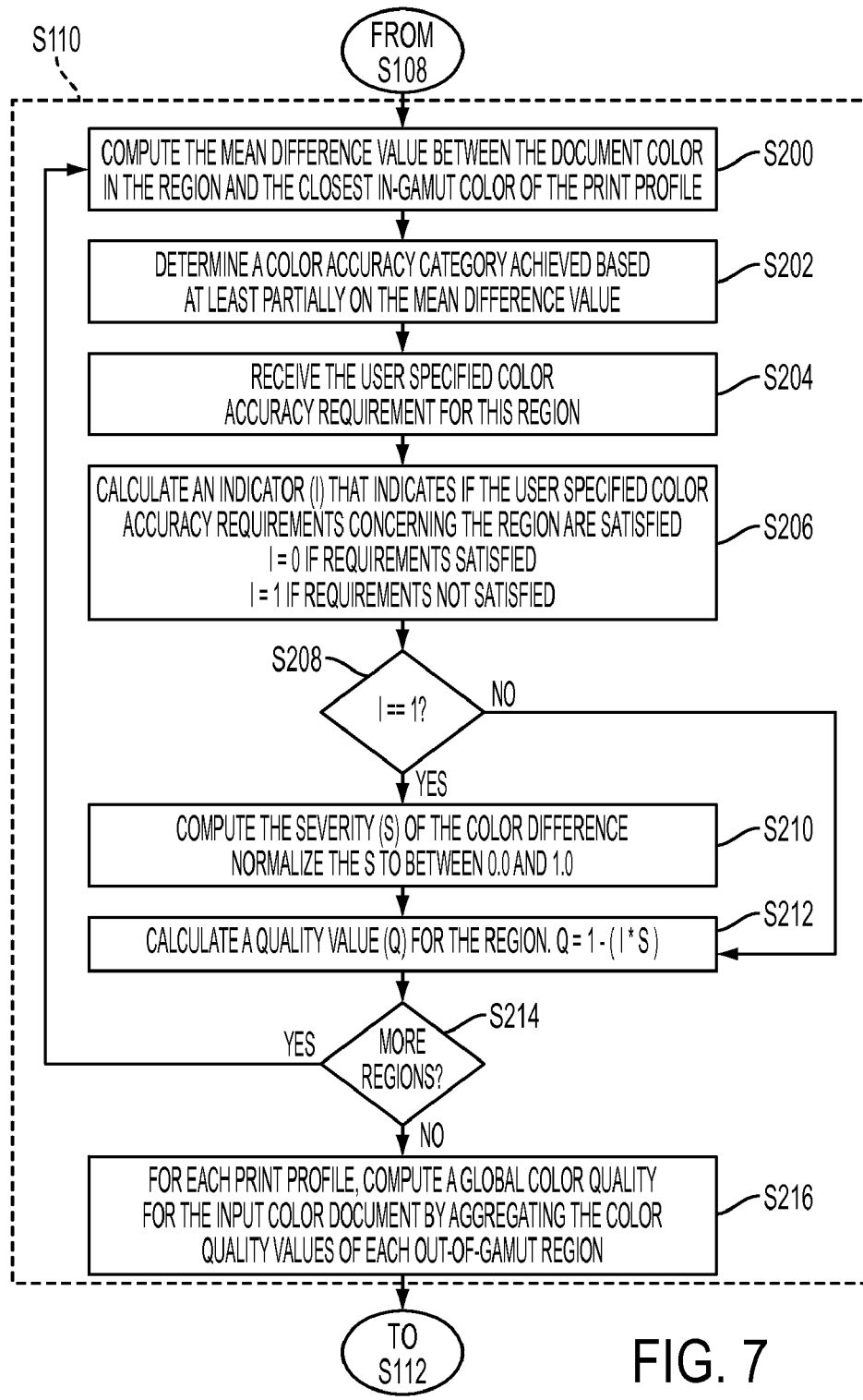
FIG. 7 is a flow diagram illustrating a method for computing color quality with respect to user requirements in accordance with another aspect of the exemplary embodiment.

With reference now to FIG. 7, S110 of FIG. 6 is illustrated in more detail. S110 computes a document color quality value for each available printer profile. The method begins with a set of out-of-gamut regions 54, 56 calculated by the color coverage review component 90 and a set of color accuracy requirements 86 received from the user 22 at S108. Actions S200 through S214 are performed for each out-of-gamut region.

At S200, for each profile, the print options review component 92 computes the mean difference value $\Delta_{pr}$ (where p=print profile and r=region) between the document color in the region and closest in-gamut color of the print profile 28, 30, or 32. The closest in-gamut color is the document color itself if the color is within the gamut of the print profile/intersection or is the on the gamut boundary with the minimal perceptual distance from the document color in the case that the document color is outside of the gamut.

At S202, the print options review component 92 verifies how close the color achieved by the respective print profile 28, 30, 32 is to the original document 26 color based at least partially on the computed mean difference value $\Delta_{pr}$ and determines a color accuracy category for the region. Taking $c_1$ and $c_2$ as constant parameters with $c_1 < c_2$:

1. If $0 <= \Delta_{pr} < c_1 * \Delta_E$ the color is close to the original document color and the color accuracy category is determined to be strong;
2. if $c_1 * \Delta_E <= \Delta_{pr} < c_2 * \Delta_E$ the color approximates the original document color and the color accuracy category is determined to be approximate; and
3. if $c_2 * \Delta_E < \Delta_{pr}$ the color is far from the original document color and the color accuracy category is determined to be low.

where $c_1$ and $c_2$ are degrees of tolerance and can be computed for each system 10 with simple experimentation, and where $\Delta_E$ is a conversion constant that enables an expression of the "distance" between two colors in the Euclidian distance metric. The value of $c_1$ will typically be less than the value of $c_2$, and, as will be appreciated in the art, the smallest color difference the human eye can see is equal to 1.0 in the Euclidian distance metric. In an alternative embodiment, instead of three color accuracy categories labelled strong, approximate, and low, the system 10 can determine color accuracy categories on a graduated scale with a large number of possible color accuracy categories.

At S204, the print options review component 92 receives the user specified color accuracy requirement for the current out-of-gamut region that was input at S108. As stated above, the exemplary embodiment expects that the user 22 will input either strong, approximate (medium), or no particular (low) color consistency as the color requirement. In the latter case, the corresponding region is tagged as ignored and not considered in the remaining steps. In an alternative embodiment, the user specified color accuracy requirements may be on a graduated scale with a large number of possible color accuracy requirement categories.

At S206, the print options review component 92 computes an indicator $I_{prc}$ (c=color requirements level) indicating if the user specified color accuracy requirement concerning the out-of-gamut region is satisfied. The value of $I_{prc}$ is 0 if the observed color accuracy category is lower than or equal to the required color accuracy level and 1 otherwise.

At S208, the print options review component 92 determines whether the user color accuracy requirements have been satisfied or not. If the indicator $I_{prc}$ equals 1, then the method proceeds to S210. Else, the method proceeds to S212.

At S210, the print options review component 92 computes a severity $S_{prc}$ of the color difference between the out-of-gamut region and each print profile 28, 30, 32 gamut. The severity $S_{prc}$ may have a value normalized to between 0 and 1. For instance, in the present exemplary embodiment, if strong consistency is required, then $S_{prc} = \tan h(\Delta_{pr}/k)$. Else if approximate consistency is required, then $S_{prc} = \tan h((\Delta_{pr} - c_1)/k)$. Here, k is a constant to be tuned and adjusts how fast the severity will increase with the color difference, and the tan h(x) function is a common hyperbolic tangent function equal to $$\frac{e^{2x} - 1}{e^{2x} + 1}.$$

The method then proceeds to S212.

At S212, the print options review component 92 computes a quality value $Q_{prc}$ for the region based at least partially on the indicator $I_{prc}$, calculated at S206 and the severity $S_{prc}$ calculated at S210. The resulting quality value for the region may be determined as $Q_{prc} = 1 - (I_{prc} * S_{prc})$.

At S214, the method returns to S200 if there are more out-of-gamut regions to be processed. Else, the method proceeds to S216.

At S216, for each print profile 28, 30, 32, the print options review component 92 computes a global color quality value $Q_g$ for the input color document by aggregating the color quality values $Q_{prc}$ of each out-of-gamut region calculated above. If a print profile 28, 30, 32 respects, for all out-of-gamut regions 54, 56, the corresponding quality requirements, then $Q_g$ is determined to be perfect. If the profile only provides approximate consistency for one or more regions where strong color quality was required by the user 22, then $Q_g$ with respect to the print profile 28, 30, 32 is determined to be of medium quality. Finally, if there are more substantial differences (such as the user 22 requiring perfect consistency where the print profile 28, 30, 32 provides low consistency) the print profile is of low quality.

To further rank each print profile 28, 30, 32 within these classes, the print options review component 92 may compute a weighted sum of differences:

$$\Sigma_{prc}=\Sigma w_c Q_{prc}.$$

where $w_c$ is a weight corresponding to the color requirements level (e.g.: strong→w=10; approximate→$w_c$=1). This provides a global Quality value $Q_g$ for the print profile 28, 30, 32. Furthermore, this sum can be normalized to obtain values between 0 and 1: $Q_p=\Sigma_{prc}/\Sigma w_c$.

After S216 is complete, the method then proceeds to S112.

The method illustrated in FIGS. 6 and 7 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 6 and 7, can be used to implement the method for selecting an optimal print profile.

As will be appreciated, the steps of the method need not all proceed in the order illustrated and fewer, more, or different steps may be performed.

The benefits of using an integrated gamut as supported by the exemplary method and system include supporting the selection of an optimal print profile for a given document, i.e., the print profile that provides the best color coverage with respect to those colors used in the document. In this respect, one may avoid using a rather expensive printing option when an inexpensive printing option is available. By responding to different user requirements, the method and system take into account printing cost in order to support the selection of the print profile that provides the best compromise between color coverage and printing cost for the user.

Additionally, most gamut alarm tools (i.e., tools that alert a user when a document is out-of-gamut) are preset to work against standard offset color profiles such as SWOP (Specifications Web Offset Publications). Users tend to use these settings for any print device and are not encouraged to test their work against a specific digital printer color profile that potentially provides better coverage. In this context, a tool such as the exemplary system allows the investigation of the available print options therefore promotes an awareness of the benefits of digital printer wherever they are under-estimated.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for print profile selection, comprising:
   receiving a color document into computer memory;
   receiving print profiles into computer memory, each of the print profiles describing a printer setup for printing the color document;
   using a computer processor, identifying at least one out-of-gamut region within the color document based at least in part on at least one of the print profiles;
   presenting the identified at least one out-of-gamut region to a user;
   receiving at least one color accuracy requirement from the user for at least one of the identified out-of-gamut regions, the user selecting the at least one color accuracy requirement for the identified region from a number of possible color accuracy requirement categories;
   computing a color quality value for each of the print profiles based at least in part on the received color accuracy requirement;
   ranking the print profiles based at least in part according to the computed color quality value; and
   outputting the ranking of the print profiles, including providing the user with a ranked list of print profiles,
   wherein the computing of the color quality value for each of the at least one print profiles based at least in part on the received color accuracy requirements comprises:
   for each print profile:
     for each of the at least one out-of-gamut region:
       calculating a mean difference value ($\Delta_{pr}$) between the document color in the out-of-gamut region and the closest in-gamut color of the print profile,
       determining an achieved color accuracy category for the out-of-gamut region based at least in part on the calculated mean difference value, and
       calculating an indicator (I) that indicates if the received color accuracy requirements for the out-of-gamut region are satisfied.

2. The method of claim 1, wherein the ranking is output to at least one of a printer, a user terminal, a computer monitor, and computer memory.

3. The method of claim 1, further comprising:
   computing an importance value for each identified out-of-gamut region;
   wherein the presentation of the identified at least one out-of-gamut region to the user is based at least in part on the computed importance value.

4. The method of claim 3, wherein the computing an importance value for each identified out-of-gamut region is performed a priori, without additional input from the user.

5. The method of claim 4, wherein the a priori importance value for each identified out-of-gamut region is computed based at least in part on at least one of the following:
   the size of the out-of-gamut region,
   the location of the out-of-gamut region,
   the color of the out-of-gamut region,
   the type of any document element contained in the out-of-gamut region, and
   the content of the out-of-gamut region.

6. The method of claim 1, wherein the identifying of at least one out-of-gamut region within the color document includes:
presenting a user with at least one option selected from the group consisting of:
1) to review the color document against a standard print profile;
2) to review the color document against the smallest common set of colors shared by all of the available print profiles; and
3) to review the color document against a print profile commonly used by the user.

7. The method of claim 1, further comprising:
receiving a user-selected print profile selected from the ranked profiles, and
printing the color document with the user-selected print profile.

8. The method of claim 1, wherein the at least one print profile comprises data describing parameters that affect an achievable color gamut for an individual printer setup, including:
printer model capabilities,
ink options, and
paper type.

9. The method of claim 1, further comprising:
receiving additional data associated with each print profile, the data including at least one of:
print cost per page,
printer availability,
printer proximity, and
printer speed; and
wherein the ranking is at least partially based on the additional data associated with each print profile.

10. A computer-implemented method for print profile selection, comprising:
receiving a color document into computer memory;
receiving print profiles into computer memory;
using a computer processor, identifying at least one out-of-gamut region within the color document based at least in part on at least one of the print profiles;
presenting the identified at least one out-of-gamut region to a user;
receiving at least one color accuracy requirement from the user for at least one of the identified out-of-gamut regions;
computing a color quality value for each of the at least one print profiles based at least in part on the received color accuracy requirements, comprising:
for each print profile:
for each of the at least one out-of-gamut region:
calculating a mean difference value ($\Delta_{pr}$) between the document color in the out-of-gamut region and the closest in-gamut color of the print profile, where p is one of the print profiles and r is an out-of-gamut region;
determining an achieved color accuracy category for the out-of-gamut region based at least in part on the calculated mean difference value;
calculating an indicator (I) that indicates if the received color accuracy requirements for the out-of-gamut region are satisfied;
computing a color difference severity value (S) based at least in part on the calculated mean difference value and the received color accuracy requirements; and
calculating a quality value (Q) for the out-of-gamut region based at least in part on the calculated indicator (I) and the severity value (S); and
computing the color quality of the color document against the print profile based on the calculated color quality values of each out-of-gamut region;
ranking the print profiles based at least in part according to the computed color quality value; and
outputting the ranking of the print profiles.

11. The method of claim 10, wherein the aggregation of the color quality values for each out-of-gamut region includes weighting each out-of-gamut region according to the color accuracy requirements.

12. The method of claim 10, wherein the achieved color accuracy category is determined to be:
strong, if $0<=\Delta_{pr}<c_1*\Delta_E$,
approximate, if $c_1*\Delta_E<=\Delta_{pr}<c_2$, and
low, if $c_2*\Delta_E<\Delta_{pr}$;
wherein $c_1$ and $c_2$ are constant parameters indicating degrees of tolerance,
$c_1$ is less than $c_2$,
$\Delta_{pr}$ is the calculated mean difference value, and
$\Delta_E$ corresponds to a predetermined smallest color difference that a human eye can see.

13. The method of claim 12, wherein the computing the color quality of the color document against the print profile comprises:
setting the color quality to perfect if the color accuracy category of every out-of-gamut region with respect to the print profile exceeds the received color accuracy requirements for the respective out-of-gamut region;
setting the color quality to medium if the print profile only provides approximate color accuracy for an out-of-gamut region where the received color accuracy requirement for the out-of-gamut region is strong; and
setting the color quality to low if the color quality cannot be set to perfect or medium.

14. A non-transitory computer program product encoding instructions which, when executed by a computer, perform the method of claim 1.

15. A computer-based system for print profile selection, comprising:
memory which stores:
a color coverage review component which includes instructions for:
receiving a color document into computer memory;
receiving print profiles into computer memory; and
identifying at least one out-of-gamut region within the color document based at least in part on the print profiles;
a print options review component which includes instructions for:
presenting the identified at least one out-of-gamut region to a user;
after the presenting, receiving color accuracy requirements from the user for the at least one out-of-gamut region;
computing a color quality value for each of the print profiles based at least in part on the received color accuracy requirements comprising, for each print profile, for the at least one presented out-of-gamut region:
calculating a mean difference value ($\Delta_{pr}$) between the document color in the out-of-gamut region and the closest in-gamut color of the print profile,
determining an achieved color accuracy category for the out-of-gamut region based at least in part on the calculated mean difference value, and calculating an indicator (I) that indicates if the received color accuracy requirements for the out-of-gamut region are satisfied;

ranking the print profiles based at least in part on the computed color quality values;

outputting the ranking for a user to select one of the print profiles; and receiving the user's selection of one of the ranked print profiles; and a processor, in communication with the components, which executes the instructions.

16. The system of claim 15, further comprising a display, and wherein the print options review component outputs the ranked list to the display.

17. The system of claim 15, wherein the print options review component includes additional instructions for:

receiving a print profile selected from the ranked list, and printing the color document.

18. The system of claim 15, wherein the color coverage review component includes instructions for:

receiving the color document through an internet based interface; and wherein the print options review module includes instructions for:

presenting the identified out-of-gamut regions to the user through an internet based interface; and outputting the ranked list through an internet based interface to at least one of a printer, a user terminal, a computer monitor, and computer memory.

19. The system of claim 15, wherein the print profiles are received from a database containing print profiles.

20. The system of claim 15, wherein the color coverage review component includes additional instructions for:

receiving additional data associated with each of the print profiles, the data including at least one of:

print cost per page, printer availability, printer proximity, and printer speed; and wherein the print options review module includes additional instructions such that the ranked list is ranked at least in part according to the additional data associated with each print profile.

21. A method for print profile selection, comprising:

for an input color document, with a computer processor, providing for identifying at least one out-of-gamut region within the color document based at least in part on at least one of a plurality of stored print profiles;

obtaining a cost of printing at least one page of the document with each of the print profiles;

computing a color quality value for each of the print profiles based at least in part on at least one of the identified out of gamut regions and a user's color accuracy requirement specified for each of the at least one identified out of gamut region, based on the user's inspection of the region, whereby different regions are considered separately;

ranking the print profiles at least in part according to the computed color quality value;

separately ranking the print profiles according to the cost of printing the at least one page of the document; and providing for a user to view the rankings wherein the computing of the color quality value for each of the at least one print profiles based at least in part on the received color accuracy requirements comprises:

for each print profile:

for each of the at least one out-of-gamut region:

calculating a mean difference value ($\Delta_{pr}$) between the document color in the out-of-gamut region and the closest in-gamut color of the print profile, determining an achieved color accuracy category for the out-of-gamut region based at least in part on the calculated mean difference value, and calculating an indicator (I) that indicates if the received color accuracy requirements for the out-of-gamut region are satisfied;

and to select a print profile based on at least one of the profile's color quality value and cost of printing.

22. The system of claim 20, wherein the additional data associated with each of the print profiles includes print cost per page, and wherein the print options review module includes additional instructions such that the ranked list is ranked at least in part according to the print cost per page associated with each print profile.

* * * * *